United States Patent Office 3,553,880
Patented Jan. 12, 1971

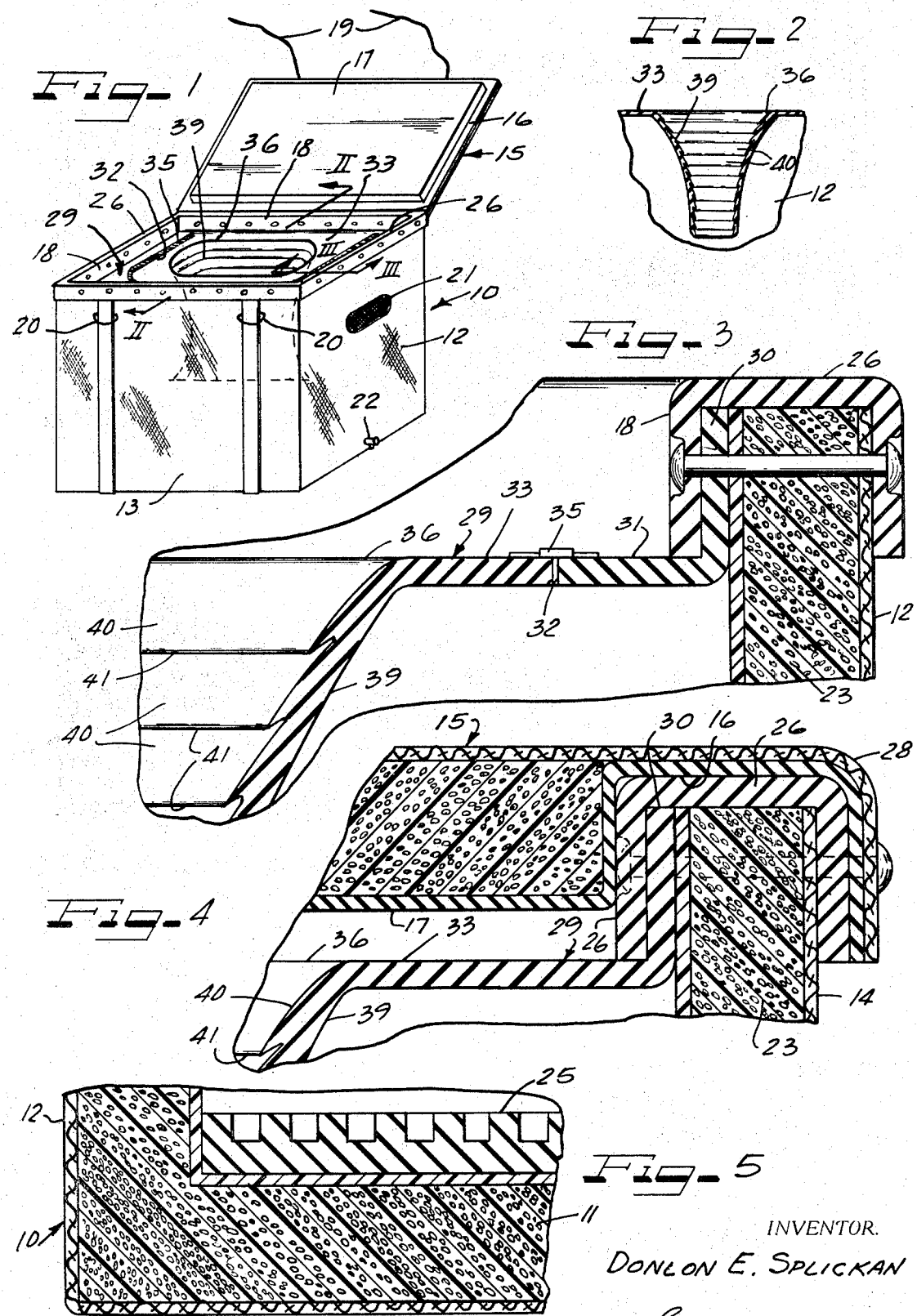

3,553,880
CONTAINER FOR FISH AND THE LIKE
Donlon E. Splickan, Rte. 2, Winslow, Ill. 61089
Filed May 7, 1969, Ser. No. 822,440
Int. Cl. A01k 97/04
U.S. Cl. 43—55
10 Claims

ABSTRACT OF THE DISCLOSURE

Insulated portable box to be used for freshly caught fish in place of the usual fish stringers. The box is relatively flexible and has a top wall having an ingress opening leading to an elongated neck or duct depending from the top wall into the container. The top wall and duct are made from rubber or a like material. The duct generally conforms to the form of an average fish and converges from the top of the container as it extends into the container. A series of vertically spaced ribs in the form of tooth-like serrations, pitched toward the bottom of the container extend along the wall of the duct, to grip a fish placed in the opening and progress a freshly caught live fish into the container, by movement of the fish, as it struggles to free itself. A lid covers the top wall and ingress opening. The lid and walls of the container are insulated to keep the container cool and to enable the container to be used for other purposes than fish. The top wall is hinged to a wall of the container to enable fish to be removed from the container.

OBJECTS OF THE INVENTION

A principal object of the present invention is to provide an improved device for containing freshly caught fish, taking the place of the usual fish stringer and arranged with a view toward advancing freshly caught live fish into the container by struggling of the live fish, as placed in the container.

Another object of the invention is to provide a container for fish and the like in the form of a portable box, arranged to take the place of the usual fish stringers or bags and to store the freshly caught fish.

Another object of the invention is to provide an improved container particularly adapted for storing freshly caught fish having an ingress opening in the top of the container and extending downwardly into the container and having a series of vertically spaced serrations extending about the opening and pitched toward the bottom of the container to grip a live fish placed therein and keeping the fish from struggling out of the container and advancing the fish into the container by struggling movement thereof.

A further object of the invention is to provide an insulated container for storing freshly caught fish and the like so arranged as to keep the fish alive after catching, and to be used for cooling and carrying cleaned fish and other food products, and for storing such products when desired.

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

FIG. 1 is a perspective view of a fish container constructed in accordance with the principles of the present invention with the lid for the container shown as being open;

FIG. 2 is a sectional view taken substantially along line II—II of FIG. 1;

FIG. 3 is a partial fragmentary transverse sectional view taken along the line III—III of FIG. 1;

FIG. 4 is a fragmentary sectional view somewhat similar to FIG. 3, but taken transversely of the container and showing the lid closed; and FIG. 5 is a fragmentary sectional view taken along the bottom and the lower portions of one end wall of the container.

DESCRIPTION OF PREFERRED EMBODIMENT OF INVENTION

In the embodiment of the invention illustrated in the drawing, a container 10 is provided, herein shown as being in the form of a rectangular insulated portable box, but which need not necessarily be rectangular and may be round or of various other constructions desired.

The container 10 includes a bottom wall 11, end walls 12, 12 and front and rear walls 13 and 14 respectively. A lid 15 is hinged to a rear wall 14 of the container and has a rectangular marginal rim 16 and a rectangular relatively thick insulated portion 17 extending inwardly from said rim. The portion 17 fits within a top opening 18 of the container and affords a means for closing and sealing the container when carrying fish therein. The lid 15 has straps or cords 19 extending over the top thereof and downwardly therefrom and adapted to be detachably connected to rings or buckles 20, on the front wall 13 of the container, to buckle or tie the lid down, when carrying the container. The tie-downs 19, 19 may be arranged in the form of handles (not shown) to afford a convenient means for carrying the container from place to place.

The end walls 12, 12 of the container have screened vents 21 therein, affording a means for venting the container when the lid 15 is closed and live fish are in the container. A drain plug 22 is provided in an end wall 12 of the container, to drain water from the container, particularly where ice may be placed therein, to cool fish or other articles in the container. The end and side walls of the container are preferably insulated walls, and are shown as having a relatively thick insulating interior wall portion 23, which may be made from a foam insulating material. A form of material particularly suitable is a closed cell neoprene insulating material. The insulating wall portion 23 may be have an inner layer of resilient material, such as neoprene covered with nylon, while the exterior of the insulating wall portion may be made from a heavy canvas. The base of the container may be made from similar materials. It should herein be understood that various other suitable materials, having insulating qualities and some flexibility may also be used.

As shown in FIG. 5, a removable rubber mat 25, which may be in the form of a grill, extends along the bottom of the container and is removable, to accommodate cleaning of the mat and the bottom of the container, when desired.

A generally U-shaped resilient clamping strip 26 extends about the tops of the front, rear and end walls of the container along opposite sides of the walls, to close the tops of said walls and clamp an upright flange 30 of a horizontal top wall 29 of the container thereto. The clamping strip 26 may be in the form of a rubber channel, and the means securing the clamping strip to the top of the rear wall of the container may also secure a canvas cover 28 of the lid 15 to the rear wall of the container, to form a hinge for said lid.

The top wall 29 of the container extends horizontally across and along the container from beneath the inner end of the U-shaped clamping strip 26 and is retained to said retainer by said clamping strip, clamping flanges 30 extending about and upwardly of said top wall 29 to the side and end walls of the container. The top wall 29 may be resilient and includes an outer generally horizontal portion 31 extending inwardly of the flanges 30 and fitting along the walls of the container. The portion 31 of the top wall 29 has a generally U-shaped inner marginal or edge portion 32, forming the inner margin thereof, and extending partially about an ingress portion 33 of said top wall.

The ingress portion 33 may be made from rubber or from one of the well-known substitutes for rubber and may be formed integrally with a rear flange 27 and connected to the rear wall of the container by the U-shaped clamping strip 26, to be hinged upwardly about the bottom of the inner leg of said clamping strip 26, to afford ready access into the interior of the container. A slide fastener 35 or other fastening device, may secure the ingress portion of the container to the wall portion 31, thereof, when using the container for freshly caught fish. The slide fastener may be of any suitable form and may extend for the full length of the edge portion 32 of the top portion 31 of the container, to form a rugged support for the ingress portion 33 of the container.

The ingress portion 33 of the container is shown as having a relatively flat top surface extending about an elongated ingress opening 36, to accommodate a relatively wide fish to be inserted head down into the container. The elongated opening 36 may be generally oval in form and terminates into a depending funnel-like spout or duct 39.

The duct 39 may also be made from rubber or from one of the well-known substitutes for rubber and converges downwardly from the ingress opening 36, to a generally conical form in transverse cross-section, and an elongated form in longitudinal cross-section. The inner wall of the neck-like depending duct 39 of the ingress opening 36 has a series of tooth-like ribs or ridges 40, 40 extending thereabout, and partially overlapping each other, to form downwardly pitched serrations or teeth having relatively sharp apices 41, undercut toward the wall of the duct from the apices 41 thereof. The ribs 40 extend entirely about the wall of the neck-like duct 39 in vertically spaced relation relative to each other from the upper to the lower end of the wall of said duct. Said tooth-like ribs are flexible enough to grip a fish as placed into the ingress opening 36, and progress a fish downwardly along said ingress opening by movement of the live fish placed head first into said ingress opening, when the hook has been removed from the fish. The fish placed into the container, thus drop from the discharge end of the duct 39 into the bottom of the container, where they may survive for a relatively long period of time when the lid 15 is closed, and fresh air is provided through the air vents 21.

It may be seen from the foregoing that when it is desired to use the container for the storage of freshly caught fish while fishing and traveling to the destination of the fisherman for cleaning, the ingress portion of the flat top portion 31 may be closed by the slide fastener 35 with the duct 39 leading downwardly thereinto. Fish may then be placed head first into the ingress opening 36, and, where freshly caught with the hook removed and still alive, will progress to the bottom of the container by the struggling action of the fish.

When it is desired to remove fish from the container for cleaning, it is merely necessary to open the slide fastener 35 and hinge the ingress portion 33 of the container upwardly, to take the fish from the container. The container may then be cleaned preferably after first removing the mat or grate 25 from the bottom of the container.

As fish are in the container, either in the boat or car, and the container is full with the days' catch, the lid 15 may be closed and tied or clasped into a closed position by the tie-downs 19, 19. The container may then be carried in the boat or car of the fisherman.

It should be understood that when fish are placed into a container of the class described, they will live for several hours, as long as the container is vented, without water, except the water entering the container as fish are placed therein.

It may further be seen the container is insulated, vented, to keep the fish cool, clean and free from flies and the like, and avoids dragging of the fish in the water and messing up the boat.

The container when cleaned can be easily washed and used to pack fillets or cleaned fish, or other articles of food, which may be iced.

I claim as my invention:

1. In a device of the class described,
a portable box-like container including a top wall extending across the container adjacent the top thereof and having an ingress opening therein for the reception of fish, said ingress opening including a duct depending from said top wall into the container and formed to generally conform to the body of the fish,
said depending duct having vertically spaced tooth-like ribs extending thereabout facing the axis of said duct and generally pitched toward the bottom of said container.

2. A fishing container in accordance with claim 1,
wherein the duct is made from a resilient material and converges from said ingress opening and has a discharge end spaced a substantial distance downwardly from said top wall, and
wherein the tooth-like ribs are in the form of downwardly pitched serrations extending entirely about the wall of said duct.

3. A fishing container in accordance with claim 1,
wherein the top wall is hinged to the container to accommodate opening of said top wall and movement of said duct out of the container, to afford access to the fish in the container.

4. The fishing container of claim 3,
wherein the box-like container has a hinged top lid closing said ingress opening and made from an insulating material having a marginal rim engaging the wall of the container and has a thickened insulating portion recessed into the top of said container, when closed.

5. The fish container of claim 4,
wherein the container has at least one vertical wall, and
wherein a ventilation opening is provided in said wall beneath said lid and top wall of the container, to provide ventilation to the interior of the container and keep fish in said container alive and fresh when said lid is closed.

6. A fishing container in accordance with claim 1, wherein the top wall and duct are made from a rubber-like material.

7. A fishing container in accordance with claim 1,
wherein the top wall and duct are resilient,
wherein the ingress opening leading into said duct is generally oval in form, and
wherein the tooth-like ribs have downwardly inclined top surfaces and apices facing inwardly from the wall of said duct, and have upwardly inclined under portions, extending outwardly from said apices to the wall of said duct and providing a series of downwardly pitched teeth, retaining fish to said ingress opening and neck to be progressed along said duct into the container by struggling movement of the live freshly caught fish.

8. The fish container of claim 7,
wherein the top wall and duct are made from a flexible rubber-like material,
wherein the ingress opening is generally oval in form, and
wherein the duct generally converges from said ingress opening as it extends downwardly into the container and generally conforms thereto.

9. A fish container in accordance with claim 7, wherein the container is box-like in form and includes parallel side and end walls arranged in right-angled relation relative to each other, a bottom wall, and a lid hinged to one of said walls, to close said container, wherein said side, end and bottom walls are made from an insulating material covered with a leak-proof material on the inside thereof and a heavy flexible covering material on the outside thereof, wherein the top wall is disposed beneath said lid and has upright flanges extending along the inside of said top and side walls, wherein a downwardly facing U-shaped strip extends about the tops of said side and end walls and secures said flange and top wall thereto, wherein the ingress opening leading into said container is generally oval in plan and said duct converges to conform to the oval shape of said ingress opening as it extends downwardly into said container, wherein said top wall includes a hinged portion hinged to a rear side wall of the container to afford ready access to the interior of the container to remove fish therefrom and also includes a stationary portion, and wherein means are provided for holding said hinged portion to said stationary portion, to retain said ingress opening and duct to extend generally vertically into the container.

10. The fishing container of claim 9, wherein the top wall and duct are made from rubber, wherein a vent is provided through a wall of said container beneath said top wall, to afford ventilation to said container when said lid is closed, and wherein slide fastener means detachably connect said hinged portion of said top wall to the stationary portion thereof.

References Cited
UNITED STATES PATENTS

| | | | |
|---|---|---|---|
| 1,942,756 | 1/1934 | Howard | 43—56 |
| 3,232,000 | 2/1966 | Gale et al. | 43—100 |
| 3,315,402 | 4/1967 | Scott et al. | 43—55 |

WARNER H. CAMP, Primary Examiner